United States Patent
Phadke et al.

(10) Patent No.: US 8,305,051 B2
(45) Date of Patent: Nov. 6, 2012

(54) AC-DC SWITCHING POWER CONVERTERS WITH FREQUENCY VARIATION IN RESPONSE TO LOAD CHANGES

(75) Inventors: Vijay G. Phadke, Pasig (PH); Gordon Currie, Quezon (PH); Arlaindo V. Asuncion, Parañaque (PH); Israel Beltran, Antipolo (PH); Melvin Co, Quezon (PH)

(73) Assignee: Astec International Limited, Kwun Tong, Kowloon (HK)

( * ) Notice: Subject to any disclaimer, the term of this patent is extended or adjusted under 35 U.S.C. 154(b) by 407 days.

(21) Appl. No.: 12/569,992

(22) Filed: Sep. 30, 2009

(65) Prior Publication Data

US 2011/0075458 A1    Mar. 31, 2011

(51) Int. Cl.
    *G05F 1/00*    (2006.01)
(52) U.S. Cl. ........................ 323/222; 323/223
(58) Field of Classification Search .............. 363/34, 363/125, 126; 323/271, 274, 282, 284, 285, 323/222, 223
See application file for complete search history.

(56) References Cited

U.S. PATENT DOCUMENTS

| | | | |
|---|---|---|---|
| 5,420,777 A | 5/1995 | Muto | |
| 5,675,479 A | 10/1997 | Tani et al. | |
| 6,714,429 B2 * | 3/2004 | Phadke | 363/89 |
| 7,102,339 B1 | 9/2006 | Ferguson | |
| 7,106,602 B2 | 9/2006 | Mabanta et al. | |
| 8,138,737 B2 * | 3/2012 | Osaka | 323/285 |
| 2006/0002155 A1 * | 1/2006 | Shteynberg et al. | 363/21.12 |
| 2006/0274468 A1 * | 12/2006 | Phadke | 361/93.1 |
| 2007/0229052 A1 * | 10/2007 | Baurle et al. | 323/284 |
| 2007/0247084 A1 * | 10/2007 | Zhao | 315/291 |
| 2008/0042709 A1 | 2/2008 | Chen et al. | |
| 2008/0130324 A1 * | 6/2008 | Choi et al. | 363/21.03 |
| 2008/0304295 A1 | 12/2008 | Chou | |
| 2008/0310191 A1 | 12/2008 | Zhu et al. | |
| 2010/0033143 A1 | 2/2010 | Asuncion et al. | |

FOREIGN PATENT DOCUMENTS

JP      07-170729      7/1995

* cited by examiner

*Primary Examiner* — Adolf Berhane
*Assistant Examiner* — Emily Pham
(74) *Attorney, Agent, or Firm* — Harness, Dickey & Pierce, P.L.C.

(57) ABSTRACT

A method of operating a switching power converter having at least one power switch controlled by a drive signal having a switching frequency is disclosed. The method includes monitoring an output power of the switching power converter, determining whether the output power has decreased below a threshold level and, in response to the output power decreasing below the threshold level, changing the switching frequency of the drive signal from a first switching frequency to a second switching frequency when an operating condition of the switching power converter is satisfied. Also disclosed are controllers and switching power converters (including PFC converters).

24 Claims, 8 Drawing Sheets

AC-DC SWITCHING POWER CONVERTERS WITH FREQUENCY VARIATION IN RESPONSE TO LOAD CHANGES

FIELD

The present disclosure relates to varying the operating frequencies of AC-DC switching power converters in response to load changes.

BACKGROUND

This section provides background information related to the present disclosure which is not necessarily prior art.

AC to DC switching power converters typically include one or more power switches for selectively connecting an input AC power source to a converter circuit. Each power switch is usually controlled by a drive signal having a constant frequency and a variable duty cycle. By adjusting the duty cycle of the drive signal, the output power of the converter is controlled.

SUMMARY

This section provides a general summary of the disclosure, and is not a comprehensive disclosure of its full scope or all of its features.

According to one aspect of the present disclosure, a method of operating an AC-DC switching power converter having at least one power switch controlled by a drive signal having a switching frequency is disclosed. The method includes monitoring an output power of the switching power converter, determining whether the output power has decreased below a threshold level and, in response to the output power decreasing below the threshold level, changing the switching frequency of the drive signal from a first switching frequency to a second switching frequency when an operating condition of the switching power converter is satisfied.

According to another aspect of the present disclosure, an AC-DC switching power converter includes an input for coupling to a rectified AC voltage, an output for providing output power to a load, a power circuit coupled between the input and the output and including at least one power switch, and a controller. The controller is configured to control the power switch with a drive signal having a switching frequency, determine whether the output power decreases below a threshold level and, in response to the output power decreasing below the threshold level, change the switching frequency of the drive signal from a first switching frequency to a second switching frequency when an operating condition of the switching power converter is satisfied.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
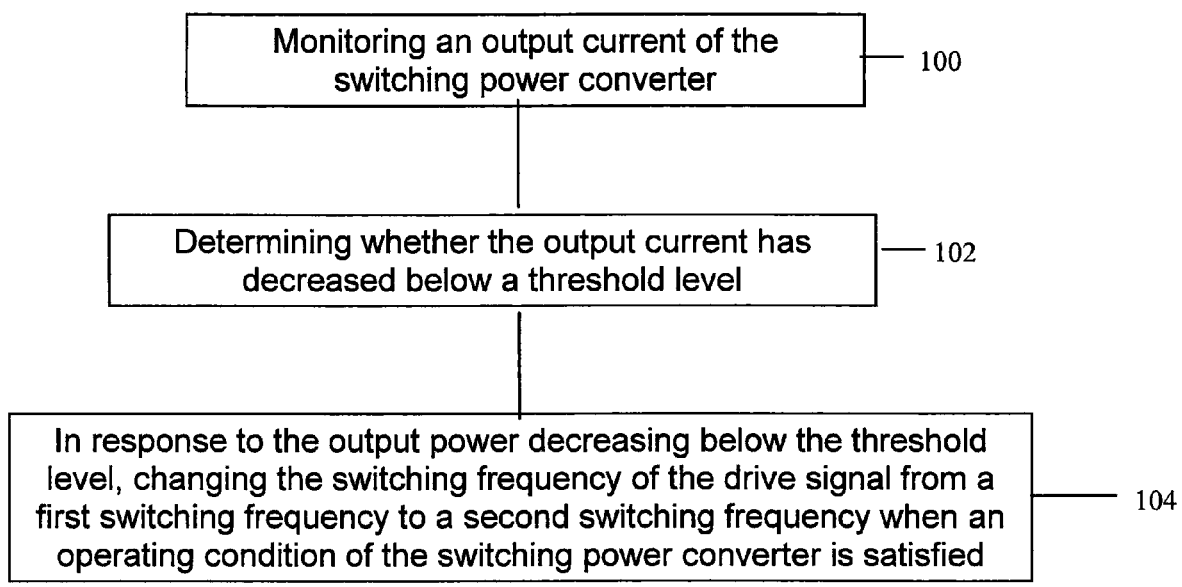
FIG. 1 is a block diagram of a method of operating an AC-DC switching power converter according to one aspect of the present disclosure.

FIGS. 5A-D are waveform diagrams illustrating a decrease in switching frequency when the load current remains below the threshold current level for a minimum time period.

FIGS. 6A-D are waveform diagrams illustrating a dynamic load condition that does not result in a switching frequency change.

FIGS. 7A-D are waveform diagrams illustrating an increase in switching frequency when the load current increases above the current threshold level.

FIGS. 8A-D are waveform diagrams illustrating an increase in switching frequency in response to a dynamic load condition that starts during a low load condition.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates a method 100 of operating an AC-DC switching power converter including at least one power switch controlled by a drive signal having a switching frequency. As shown in FIG. 1, the method 100 includes monitoring an output power of the switching power converter in block 102, determining whether the output power has decreased below a threshold level in block 104 and, in response to the output power decreasing below the threshold level, changing the switching frequency of the drive signal from a first switching frequency to a second switching frequency when an operating condition of the switching power converter is satisfied, as indicated in block 106. In this manner, the switching frequency of the drive signal may be changed in response to a change in output power that is indicative of a load change.

The first switching frequency may be greater or less than the second switching frequency. In some embodiments, the switching frequency is changed from the first switching frequency to the second switching frequency to improve the efficiency of the power converter during a reduced load condition. For example, if the power converter design is dominated by capacitive switching losses (e.g., MOSFET gate capacitance, choke winding capacitance, etc.), the first frequency may be greater than the second frequency so the switching frequency is decreased to improve the efficiency of the power converter during the reduced load condition. Other power converter designs may be dominated by core loss. In that event, the first frequency may be less than the second frequency so the switching frequency is increased to improve the efficiency of the power converter during reduced load conditions. The second frequency may be equal to a minimum frequency at which the power converter can operate during the reduced load condition without saturating magnetic components. Alternatively, the switching frequency may be changed for reasons other than improving efficiency. In that event, the first and second switching frequencies may be selected based on other factors.

As noted above, the switching frequency of the drive signal is changed when an operating condition of the power converter is satisfied. This operating condition may be defined as desired for any given application of these teachings. In some embodiments, the operating condition is defined so that the change in switching frequency will not cause significant disruption in the control and/or magnetic components to saturate. For example, if the power converter is coupled to a rectified AC input voltage, the operating condition may be defined as when the AC input voltage is about zero volts. In this manner, changing the switching frequency when the AC input voltage is about zero volts will not cause a sudden increase in inductor current that could, in turn, result in an unstable condition. A voltage less than ten percent of the peak rectified AC input voltage could be considered about zero volts.

The switching frequency may be changed as soon as the output power has decreased below the threshold level and the defined operating condition is satisfied. Alternatively, the switching frequency may be changed some time after the output power has decreased below the threshold level and the defined operating condition is satisfied. For example, the output power may be required to remain below the threshold level for a minimum time period before the switching frequency is changed. In this manner, changing the switching frequency in response to momentary (i.e., shorter than the minimum time period) dips in the output power can be avoided if desired. The minimum time period may be based on a specification of the switching power converter such as the dynamic load specification. In some embodiments, the switching frequency is changed the next time the operating condition is satisfied after the minimum time period has elapsed.

The output power may be monitored by, e.g., measuring (or inferring from another system variable such as a pulse width of the drive signal) the output current and the output voltage and calculating the output power. In the case of power converters having a constant voltage output, the output power can be monitored by monitoring only the output current. The monitored output current may be compared with a current threshold. Similarly, in the case of power converters having a constant current output, the output power can be monitored by monitoring only the output voltage. The monitored output voltage may be compared with a voltage threshold. The controller may also receive inputs indicating the input current and/or input voltage.

The method may further include, in response to the output power increasing above the threshold level, changing the switching frequency of the drive signal from the second switching frequency to the first switching frequency when the operating condition of the power converter is satisfied.

As apparent to those skilled in the art, when the output power is equal to the threshold level, this can be interpreted as the output power being above the threshold level or the output power being below the threshold level.

Although only two switching frequencies are mentioned above, the method may alternatively employ three or more frequencies in any given embodiment. For example, three different switching frequencies may be employed, with each switching frequency corresponding to a different range of output power levels.

Additionally, the method described above may be performed upon start up of the switching power converter or alternatively, after some delay. For example, if the power converter is configured to have a constant voltage output, performance of the method may be delayed until the output voltage reaches a setpoint voltage and a defined settling time has expired. In some embodiments, the settling time may be on the order of 100 ms to 200 ms after the output voltage reaches the setpoint voltage.

The method described above may be implemented in hardware or a combination of hardware and software. The hardware may include analog circuits, digital circuits, or a combination of analog and digital circuits. Further, the power converter may employ any suitable topology such as, e.g., a boost, buck, buck-boost, flyback or other topology. In some embodiments, the power converter is an active PFC converter.

The power converter may be coupled to any suitable AC input source including, for example, a single phase or multiphase (e.g., three-phase) utility grid, the output of a DC-AC inverter, etc.

Some examples of AC-DC power converters suitable for implementing the method described above will now be described with reference to FIGS. 2-8. It should be understood, however, that the teachings of this disclosure are not limited to the example power converters described below, and can be implemented in a variety of other AC-DC power converter designs.

Figure 2:
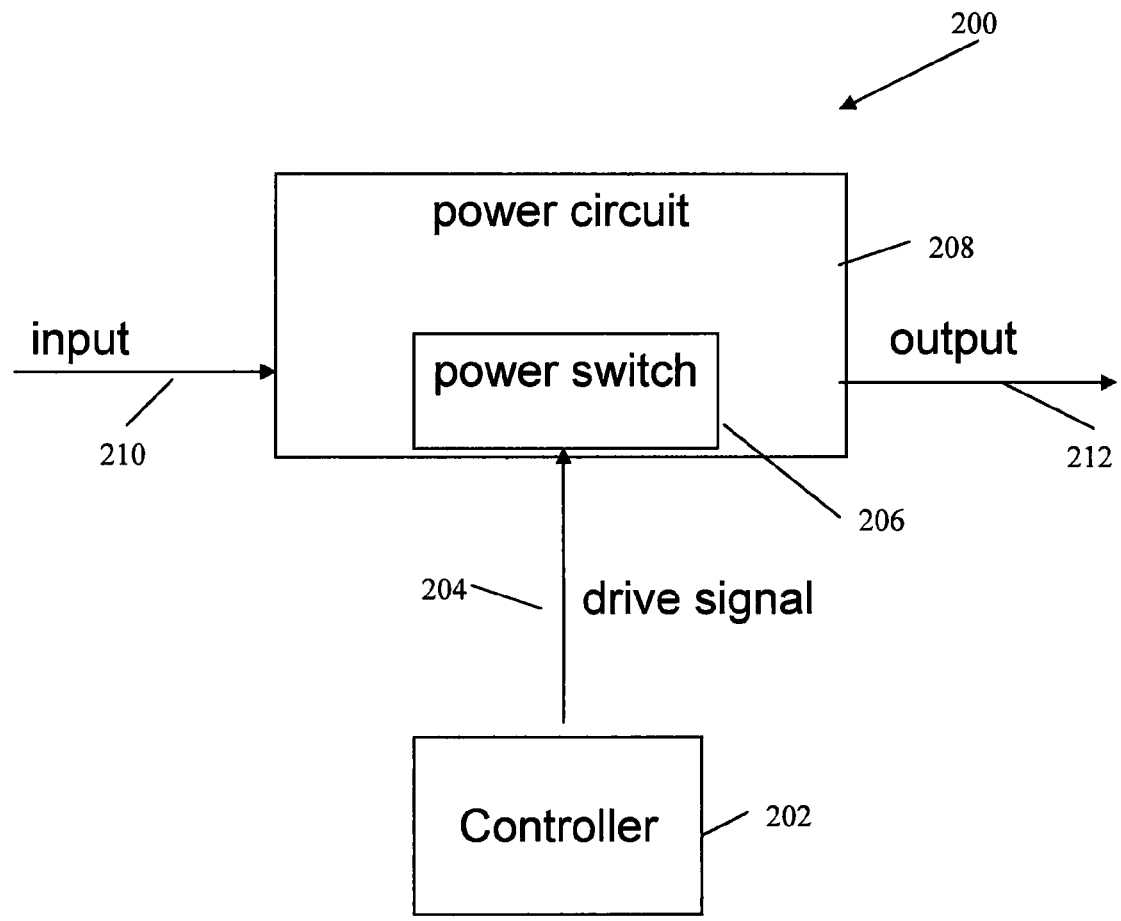
FIG. 2 is a block diagram of an AC-DC switching power converter according to one example embodiment of the present disclosure.

FIG. 2 illustrates one example embodiment of an AC-DC switching power converter 200. As shown in FIG. 2, the power converter 200 includes an input 210 for coupling to a rectified AC voltage, an output 212 for providing output power to a load (not shown), and a power circuit 208 coupled between the input 210 and the output 212. The power circuit 208 includes at least one power switch 206. The power converter 200 further includes a controller 202 configured to control the power switch 206 with a drive signal 204 having a switching frequency. The controller 202 is configured to determine whether the output power decreases below a threshold level. For this purpose, the controller may receive feedback signal(s) (not shown) representing, e.g., the output current and/or the output voltage of the power converter 200. In response to the output power decreasing below the threshold level, the controller changes the switching frequency of the drive signal 204 from a first switching frequency to a second frequency when an operating condition of the switching power converter 200 is satisfied.

Switching power converter 200 may be configured to provide a constant voltage or a constant current at the output 212. Further, the power converter 200 may be a boost converter, a buck converter, a buck-boost converter, or any other suitable type of switching power converter. The converter 200 may be the first or subsequent stage of a multi-stage power converter. Thus, input 210 may be connected to a prior stage of a multi-stage power converter or may be, for example, connected to a single or multi-phase AC utility grid. The load (not shown) connected to output 212 may be a subsequent stage of a multi-stage power converter or any other load type. Additionally, the switching power converter 200 may an active power factor correction (PFC) circuit. The controller may be configured to perform the method and related alternatives described above.

Figure 3:
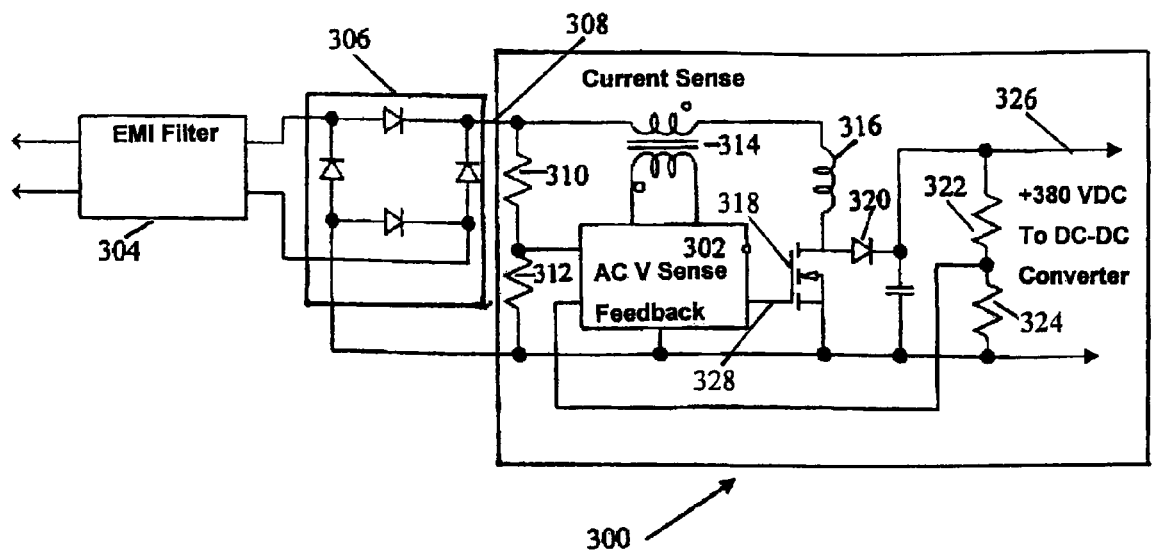
FIG. 3 is a block diagram of a PFC boost converter according to another example embodiment of the present disclosure.

FIG. 3 illustrates one example embodiment of a PFC converter 300 having a constant voltage output. The converter 300 includes a controller 302. AC mains (not shown) is connected to EMI filter 304 which feeds a diode bridge 306. Rectified AC is connected to input 308. Resistor 310 and resistor 312 attenuate the rectified AC for input to the controller 302. Current sense 314 is also connected to the controller 302. Inductor 316, power switch 318, diode 320, and capacitor 321 are connected to form a boost power circuit. The voltage at output 326 is attenuated by resistor 322 and 324 for feedback to the controller 302. Controller 302 controls the power switch 318 with a drive signal 328.

Figure 4A:
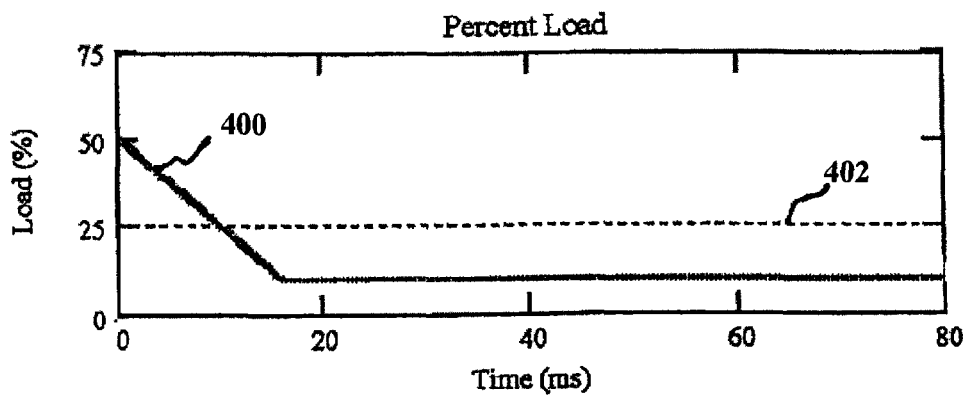
FIGS. 4A-4C are waveform diagrams illustrating a decrease in switching frequency for the converter of FIG. 3 when the load current decreases below a threshold current level.
Figure 4B:
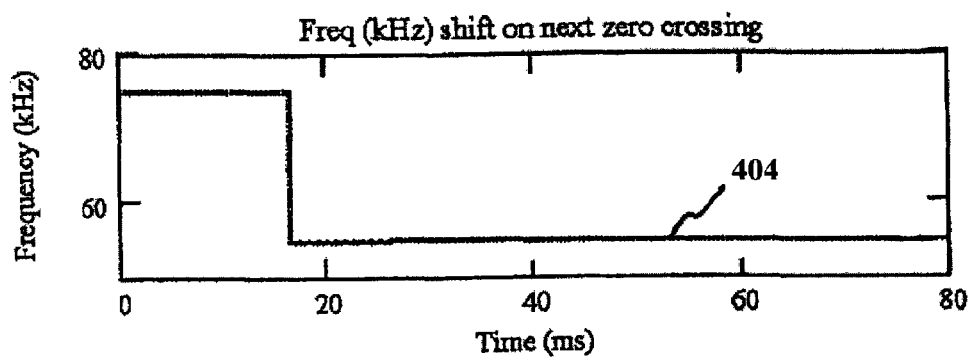
Figure 4C:
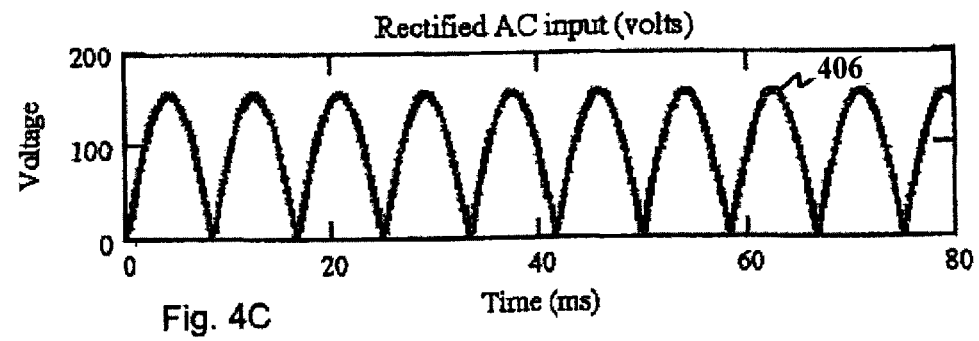

The controller 302 is configured to set the switching frequency of drive signal 328. The controller 302 determines whether the current at output 314 decreases below a current threshold level. When this happens, the controller 302 changes the switching frequency from a first switching frequency to a second frequency when the rectified AC voltage at input 308 is about zero volts. This is illustrated in FIGS. 4A-C where the load current 400 is shown as a percentage of full rated load current. In this example, the current threshold level 402 is set to twenty five percent of the full load current, and the switching frequency 404 is shifted between 75 kHz and 55 kHz. Voltage input 406 is the rectified AC voltage input. Initially, the operating frequency is set at 75 kHz, as shown in FIG. 4B. This is the minimum operating frequency at which the power converter 300 is designed to handle full load (and possibly an overload condition) without saturation. If the load current 400 remains above twenty-five percent of the full load current, the operating frequency will remain at 75 kHz. However, when the load current decreases below the threshold level 402 as shown in FIG. 4A, the switching frequency is changed from 75 kHz to 55 kHz (as shown in FIG. 4B) the next time the rectified AC voltage input is about zero volts.

FIGS. 5-8 illustrate examples of changing the switching frequency only if the output current remains below the threshold level for a minimum time period. In these examples, the minimum time period is preset to 50 ms. It should be understood, however, that different time periods may be chosen for any given application of these teachings.

Figure 5A:
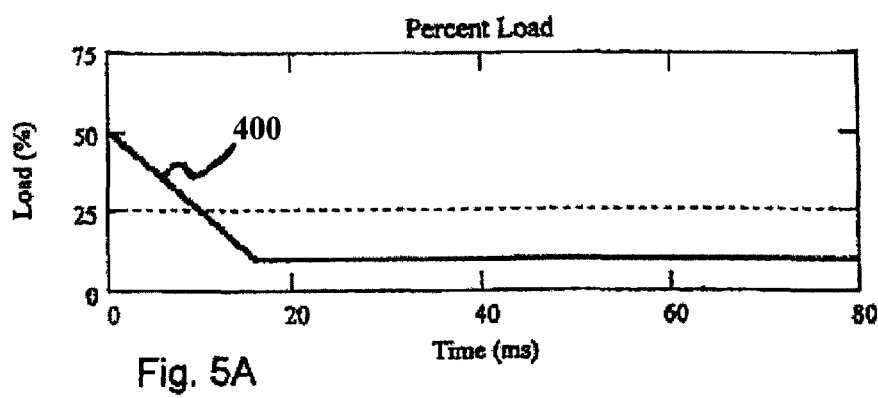
Figure 5B:
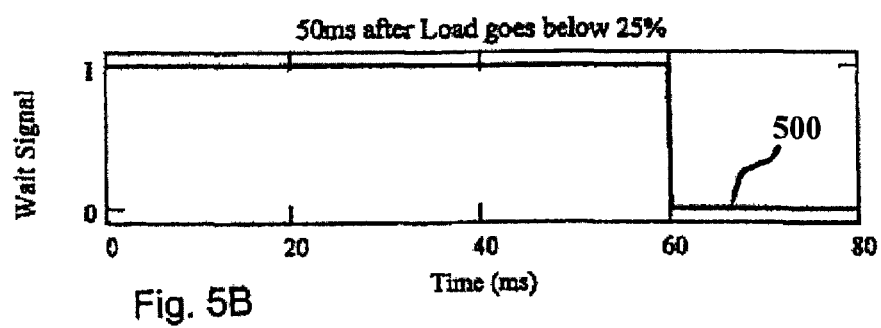
Figure 5C:
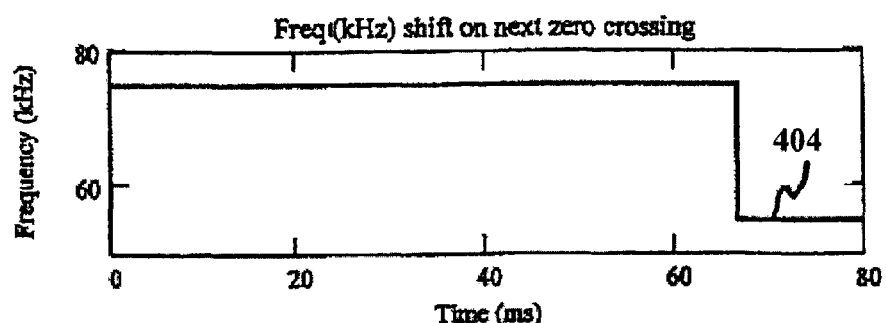
Figure 5D:
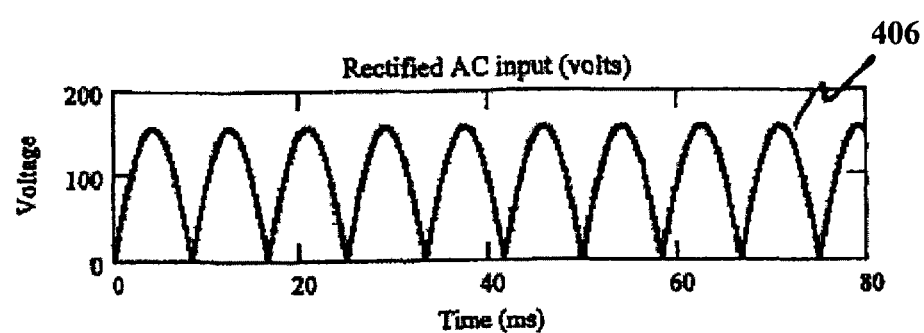
Figure 6A:
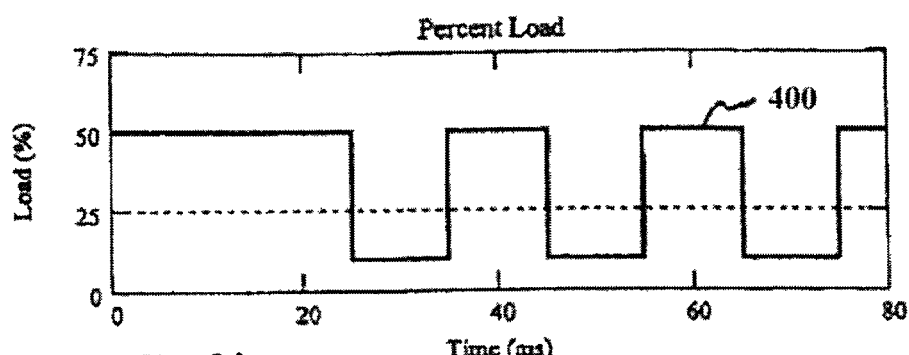
Figure 6B:
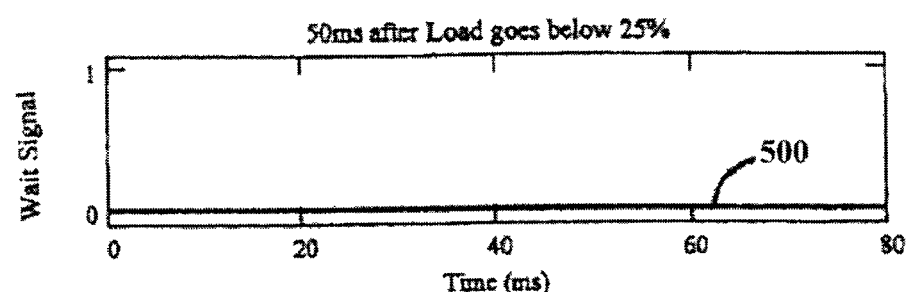
Figure 6C:
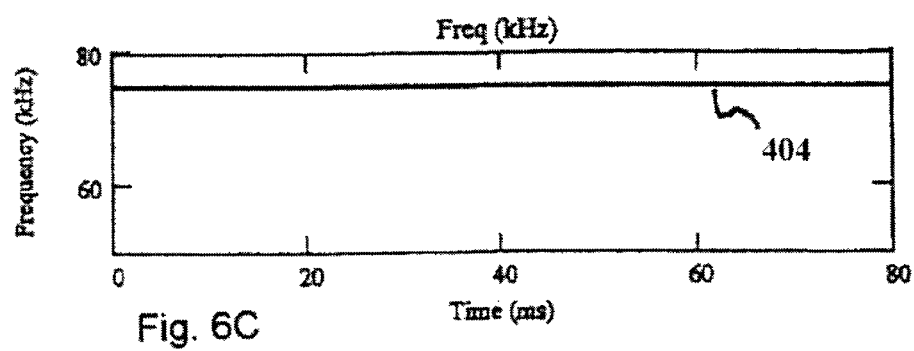
Figure 6D:
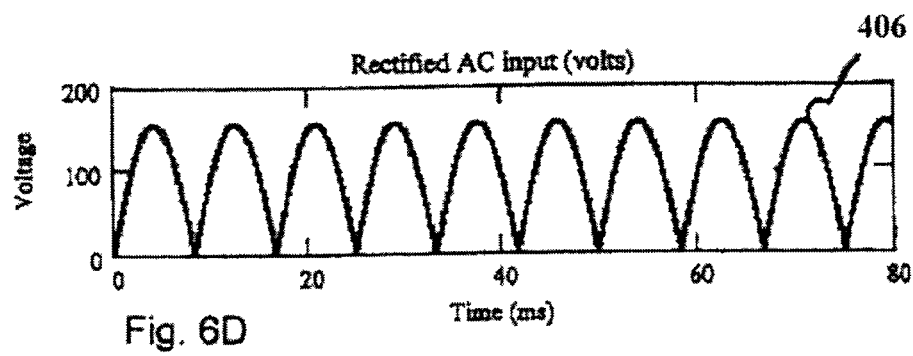

As shown in FIG. 5B, a wait signal 500 transitions to a low level 50 ms after the load current 400 decreases below the threshold level 402 as shown in FIG. 5A. Once the wait signal 500 goes low, the switching frequency 404 is changed from 75 KHz to 55 kHz (FIG. 5C) the next time the rectified AC voltage input is about zero volts (FIG. 5D).

FIGS. 6A-D illustrate a related example of the load current 400 decreasing below the threshold current level 402 for less than 50 ms at a time. Since the load current 400 does not remain below the threshold level 402 for 50 ms, the switching frequency 404 remains at 75 kHz and is not changed.

The examples of FIGS. 7 and 8 assume a load hysteresis of 10%, and a requirement for improved efficiency for twenty percent (or less) load conditions. Therefore, the threshold current level is set at thirty percent of full load current.

Figure 7A:
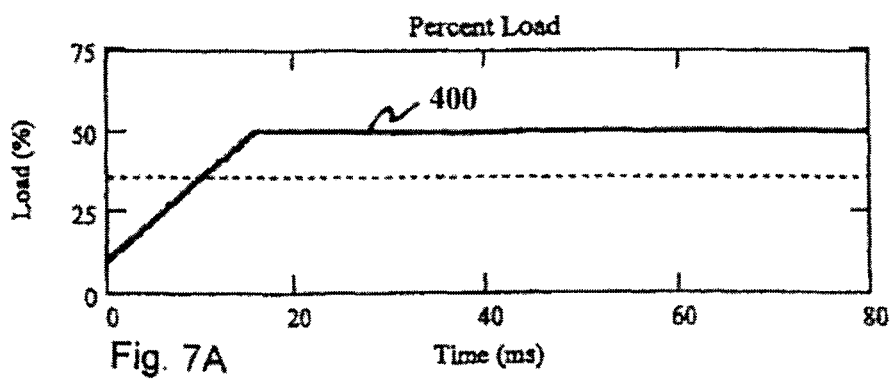
Figure 7B:
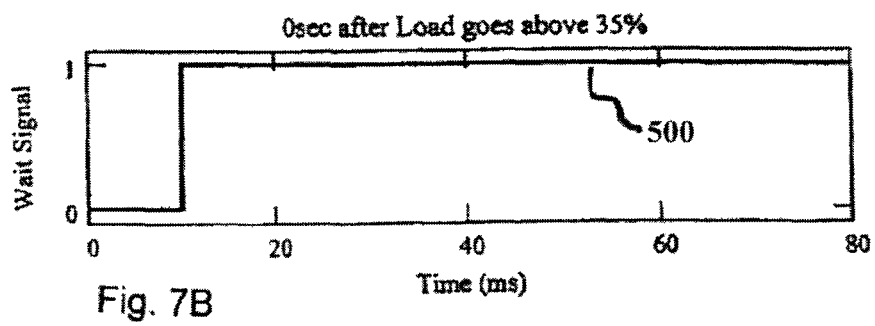
Figure 7C:
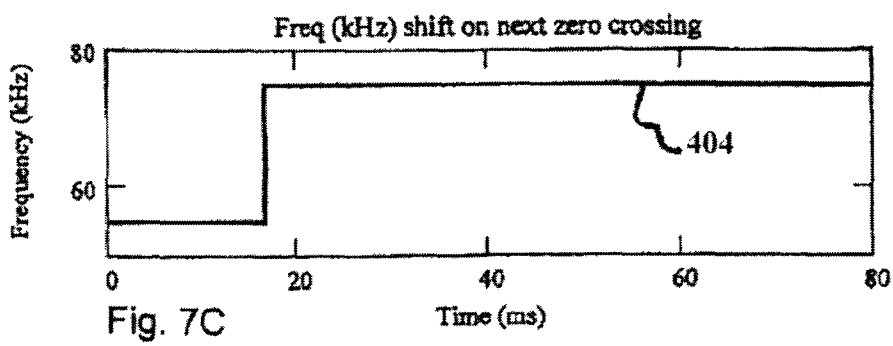
Figure 7D:
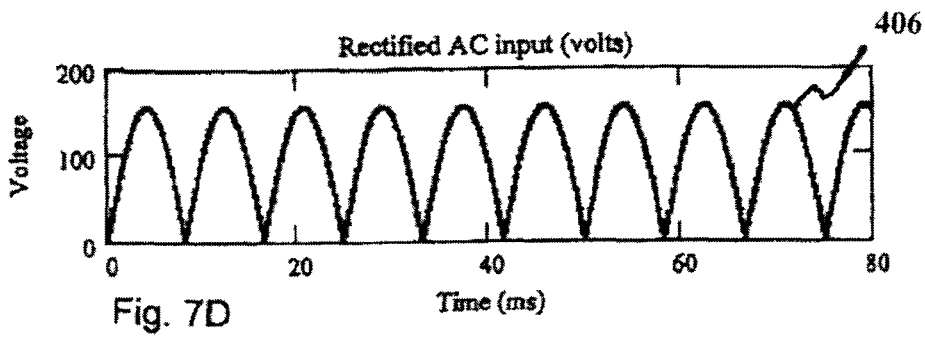

FIGS. 7A-D illustrate an example of changing the switching frequency from 55 kHz back to 75 kHz when the output current increases above the threshold level after falling below the threshold level for more than 50 ms. As shown in FIG. 7B, the wait signal 500 transitions from low to high as soon as the load current rises above the threshold level 402. The next time the AC voltage input 406 is about zero volts, the controller 302 changes the switching frequency 404 to 75 kHz. Thus, in this example, the switching frequency is increased as soon as the load current increases above the threshold level, but is decreased only if the load current remains below the threshold level for a minimum time period (e.g., 50 ms).

Figure 8A:
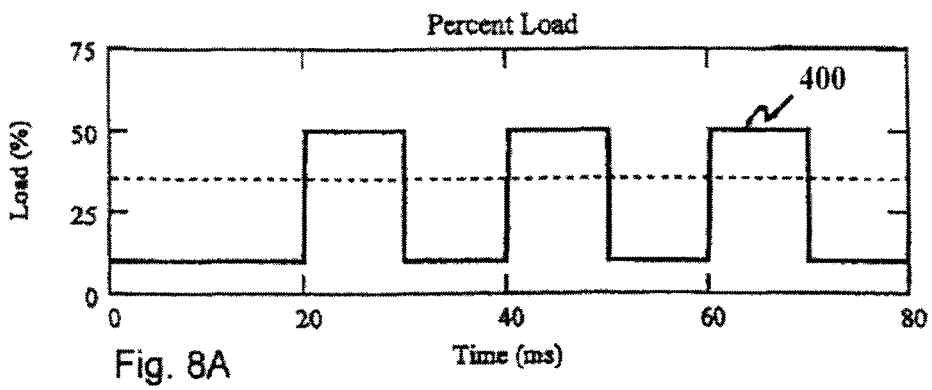
Figure 8B:
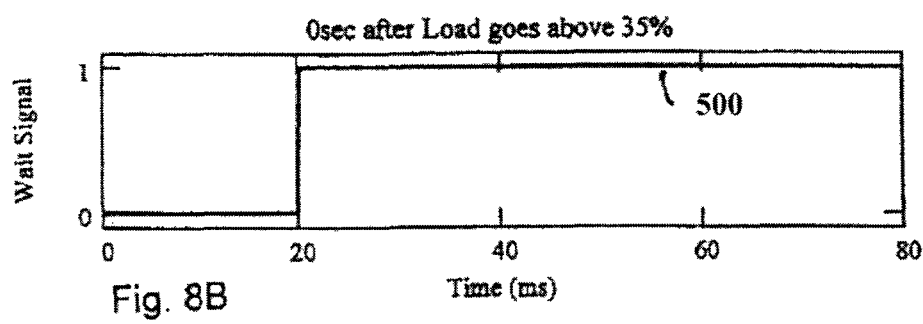
Figure 8C:
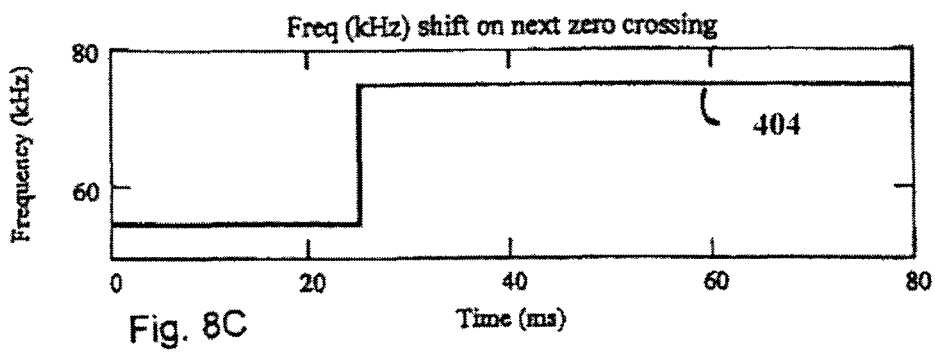
Figure 8D:
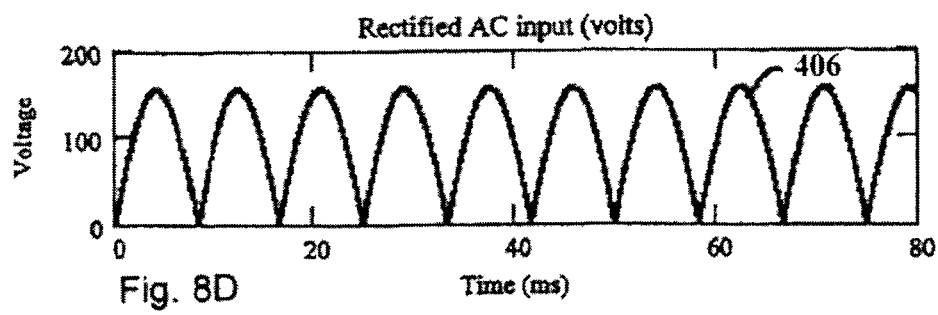

FIGS. 8A-D illustrate an example of the load current 400 momentarily rising above the threshold level 402 when the switching frequency 404 is 55 kHz. The wait signal 500 transitions from low to high when the load current 400 rises above the threshold level 402. The next time the rectified voltage input 406 is about zero volts, controller 302 changes the switching frequency 404 from 55 kHz to 75 kHz. Since the load current 400 remains below the threshold level 402 for less than 50 ms at a time (as shown in FIG. 8A), the controller 302 does not change the switching frequency 404 back to 55 kHz.

What is claimed:

1. An AC-DC switching power converter comprising:
an input for coupling to a rectified AC voltage;
an output for providing output power to a load;
a power circuit coupled between the input and the output and including at least one power switch; and
a controller configured to:
control the power switch with a drive signal having a switching frequency;
determine whether the output power decreases below a threshold level; and
in response to the output power decreasing below the threshold level, change the switching frequency of the drive signal from a first switching frequency to a second switching frequency when the rectified AC voltage is about zero volts to improve efficiency of the AC-DC switching power converter.

2. The converter of claim 1 wherein the controller is further configured to change the switching frequency of the drive signal only if the output power remains below the threshold level for a minimum time period.

3. The converter of claim 2 wherein the power converter is configured to provide a substantially constant output voltage, and wherein the controller is configured to determine whether the output power decreases below the threshold level by monitoring an output current, and to change the switching frequency in response to the output current decreasing below a current threshold level.

4. The converter of claim 2 wherein the controller is further configured to change the switching frequency from the second switching frequency to the first switching frequency in response to the output power increasing above the threshold level.

5. The converter of claim 2 wherein the controller is configured to change the switching frequency of the drive signal a first time the rectified AC voltage is about zero volts after the minimum time period.

6. The converter of claim 1 wherein the controller is configured to change the switching frequency of the drive signal a first time the rectified AC voltage is about zero volts after the output power decreases below the threshold level.

7. The converter of claim 1 wherein the power converter is configured to provide a substantially constant output voltage, and wherein the controller is configured to determine whether the output power decreases below the threshold level by monitoring an output current, and to change the switching frequency in response to the output current decreasing below a current threshold level.

8. The converter of claim 1 wherein the power converter is an active power factor correction circuit.

9. The converter of claim 1 wherein the power converter is configured to provide a substantially constant output current, and wherein the controller is configured to determine whether the output power decreases below the threshold level by monitoring an output voltage, and to change the switching frequency in response to the output voltage decreasing below a voltage threshold level.

10. The converter of claim 1 wherein the controller is configured to not change the switching frequency during a defined wait period following start-up of the power converter.

11. The converter of claim 1 wherein the first switching frequency and the second switching frequency are set at predetermined values.

12. A method of operating an AC-DC switching power converter having an input for coupling to a rectified AC voltage and at least one power switch controlled by a drive signal having a switching frequency, the method comprising:
monitoring an output power of the switching power converter;
determining whether the output power has decreased below a threshold level; and
in response to the output power decreasing below the threshold level, changing the switching frequency of the drive signal from a first switching frequency to a second switching frequency when the rectified AC voltage is about zero volts to improve efficiency of the AC-DC switching power converter.

13. The method of claim 12 wherein changing includes changing the switching frequency of the drive signal only if the output power remains below the threshold level for a minimum time period.

14. The method of claim 13 wherein changing includes changing the switching frequency of the drive signal a first time the rectified AC voltage is about zero volts after the minimum time period.

15. The method of claim 12 further comprising:
in response to the output power increasing above the threshold level, changing the switching frequency of the drive signal from the second switching frequency to the first switching frequency when the rectified AC voltage is about zero volts.

16. The method of claim 12 wherein the first frequency is greater than the second frequency.

17. The method of claim 12 wherein the first frequency is less than the second frequency.

18. The method of claim 12 wherein the switching power converter is a PFC converter.

19. The method of claim 12 wherein the input of the switching power converter is coupled to an AC utility grid.

20. A controller for a switching power converter, the controller configured to perform the method of claim 12.

21. The method of claim 12 wherein the switching power converter is configured to provide a substantially constant output voltage, wherein determining includes monitoring an output current, and wherein changing includes changing the switching frequency in response to the output current decreasing below a current threshold level.

22. The method of claim 12 wherein the switching power converter is configured to provide a substantially constant output current, wherein determining includes monitoring an output voltage, and wherein changing includes changing the switching frequency in response to the output voltage decreasing below a voltage threshold level.

23. The method of claim 12 wherein the first switching frequency and the second switching frequency are set at predetermined values.

24. The method of claim 12 wherein changing includes changing the switching frequency of the drive signal a first time the rectified AC voltage is about zero volts after the output power decreases below the threshold level.

* * * * *